W. Kenyon.
Cutting Screws.

Nº 18,909. Patented Dec. 22, 1857.

UNITED STATES PATENT OFFICE.

WILLIAM KENYON, OF STEUBENVILLE, OHIO.

SCREW-CUTTING MACHINE.

Specification of Letters Patent No. 18,909, dated December 22, 1857.

*To all whom it may concern:*

Be it known that I, WILLIAM KENYON, of Steubenville, in the county of Jefferson and State of Ohio, have invented a new and useful Improvement in Screw-Cutting Machines; and I do hereby declare that the following is a full, clear, and exact description of the same, reference being had to the accompanying drawings, forming part of this specification, in which—

Figure 1:
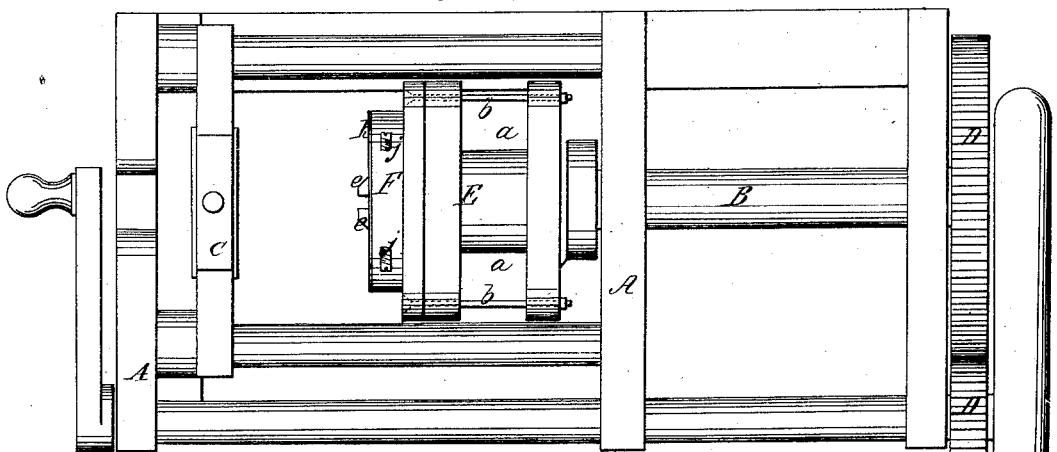
Figure 3:
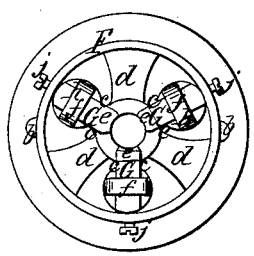
Figure 4:
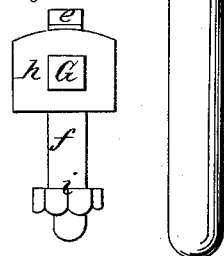
Figure 2:
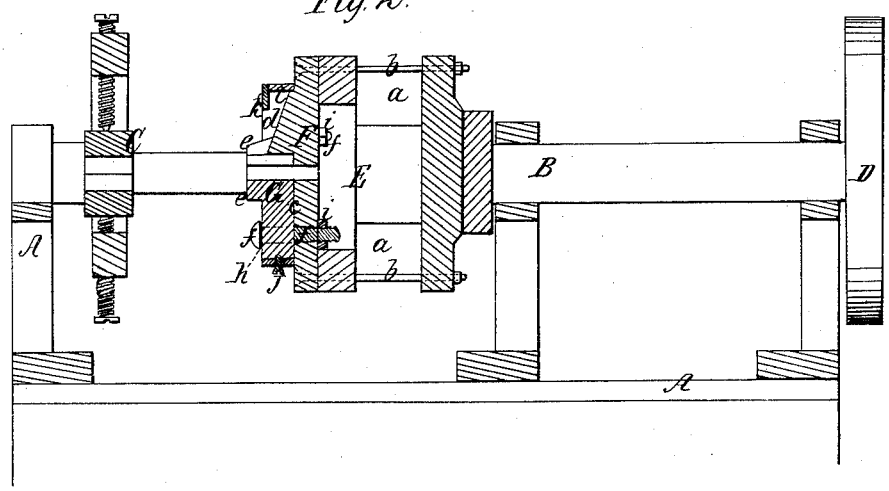

Figure 1, is a plan or top view of a screw cutting machine with my improvements applied to it. Fig. 2, is a vertical, longitudinal section of the same. Fig. 3, is an end view of the die chuck, and Fig. 4, a view of the eye bolt and die.

Similar letters of reference in each of the several figures indicate corresponding parts.

The nature of my invention consists in constructing the dies with an angular cutting extension or shoulder on their front face, and arranging the dies thus constructed in straight radial grooves of the chuck, and confining the same by means of eye and screw bolts.

My invention consists, 2nd, in providing peculiar oil reservoirs in front of the chuck between the cutting dies, said reservoirs extending from the circumference to the center of the chuck, and communicating with one another.

My invention consists, 3rd, in having the face plate formed of a short, hollow, cylinder which has openings in its periphery.

By the 1st feature of my invention, a chance for cutting the screw thread close up to the head of the bolt is secured, either of the dies can be readily removed without disturbing the others, and much of the labor spent, at present, in filing and finishing the chuck, which confines the dies by dovetails, is saved and thus the cost of the chuck reduced considerably.

By the second feature, the oil can be introduced continually to the cutting edges of the dies, and to the screw bolt being operated upon, and the surplus or waste oil can be saved as it has a chance to run back into the reservoirs as the chuck revolves.

By the 3rd feature, the fine cuttings have a chance to escape through the openings in the periphery of the face plate, and the heat of the bolt has a chance to radiate freely, and thus is avoided an expansion of the thread as fast as it passes behind the dies by reason of too great heat in the bolt, and consequently a stripping or drawing off of the same, as the bolt is run back, in a manner to reduce the same, and thus produce an imperfect screw or one with different threads, is prevented.

To enable other skilled in the art to make and use my invention, I will proceed to describe its construction and operation.

A, A, represents the frame of a screw cutting machine.

B, is the shaft upon which the face plate and die chuck are arranged. C, is the carriage which feeds the bolt up to the dies. D, D, gearing for giving rotary motion to the die shaft.

E, is the face plate; it consists of a short, hollow cylinder with passages $a$, $a$, in its circumference which allow a current of air to circulate around the screw bolt and a radiation of heat from the bolt as fast as the thread is cut, and thus is avoided an expansion of the thread by reason of the bolt not being allowed to retain its heat after it escapes from the dies. These openings also allow a ready escape of the fine chips or cuttings which pass from the dies with the thread which is cut. This is an important feature in screw cutting, as great inaccuracy in the thread of the screws is caused by the expansion of the thread, owing to the bolt being highly heated, after it is cut and passes from the die. By thus avoiding the expansion of the threads they all remain uniform as no stripping off takes place in the return of the screw back through the dies.

F, represents the chuck, it is fastened to the face plate by means of longitudinal screw bolts $b$, $b$. This chuck has straight radial grooves $c$, $c$, $c$, whose sides are at right angles to their bottoms. Between these grooves, oil reservoirs $d$, $d$, $d$, are formed, said reservoirs terminating in the eye or at the center of the chuck, in such a manner that whatever portion of the oil that flows from one on to the bolt and dies, is not consumed can flow into another, and thus be saved from being wasted. This arrangement also secures a regular and constant supply of oil to the bolt and dies.

G, G, G, are the dies made with the most approved cutting edge. The cutting portion of these dies is extended at right angles to the arm or shank beyond the face of the chuck as at $e$, $e$, $e$, in order that the screw thread may be cut entirely up to the head of the bolt; also in order that eye bolts $f, f, f,$ may be employed, without interfering with the cutting of the thread up to the head of the bolt, for confining the dies in grooves having sides which are at right angles to their bottoms. The dies G, G, G, are passed through the eyes $h, h, h,$ of the bolts and the bolts passed through holes in the chuck, and fastened by means of nuts $i,$ which by being screwed up to the back side of the chuck cause the bolts to draw the dies into the grooves and hold them there securely. By loosening the nuts $i,$ and turning the set screws $j, j, j,$ the dies can be adjusted in or out as occasion requires.

In order to confine the oil in the reservoirs more effectually the reservoirs are made to recede from center to circumference at their bottom, and a narrow ring plate or guard $k,$ is placed over them so as to form a chamber $l,$ near the periphery of the chuck into which the oil of each reservoir may run and remain until brought to a position to fall by its gravity upon the bolt and dies.

What I claim as my invention and desire to secure by Letters Patent, is—

1. The combination of dies which have an angular cutting extension or shoulder $e$ on their front face, with the eye screw bolts $f, h,$ and a chuck which has straight radial grooves in its face, substantially as and for the purposes set forth.

2. Providing the peculiar oil reservoirs in the front of the chuck, between the cutting dies, in the manner and for the purposes set forth.

3. The face plate, consisting of a short hollow cylinder with openings in its periphery; substantially as and for the purposes set forth.

WILLIAM KENYON.

Witnesses:
G. Y. ATLEE,
EDM. F. BROWN.